3,234,729
HYBRID ROCKET MOTOR PROCESS USING
SOLID AND LIQUID PHASES
David Altman, Menlo Park, and Barnet R. Adelman,
Atherton, Calif., assignors to United Aircraft Corporation, East Hartford, Conn., a corporation of Delaware
No Drawing. Filed Apr. 9, 1963, Ser. No. 271,597
3 Claims. (Cl. 60—35.4)

This invention relates to hybrid rocket motors and more particularly relates to a novel fuel system for use in such motors. The most common form of hybrid motor is one employing a solid fuel and a liquid oxidizer but the opposite configuration can be used wherein the fuel is a liquid and the oxidizer is a solid. The technique of the present invention is applicable to both systems.

Hybrid rocket motors combine some of the best features of liquid propellant motors with those of solid propellant motors. Thus, such motors have a high efficiency, good storage stability and have the ability to be started and stopped as well as having the burning rate varied while the rocket is in flight.

One difficulty with such motors as have been employed in the past is that some means must be provided for vaporizing the liquid component prior to introduction of the liquid onto the solid component in the combustion chamber if greatest efficiency is to be achieved. The mechanism of combustion in a hybrid motor requires that the liquid component vaporize and diffuse toward the combustion zone in the boundary layer of the solid surface. If the material is injected as a liquid, the vaporization process requires the absorption of heat from the flame and hence creates a time lag which is translated into a distance requirement down the port of the motor. If the heat absorption requirement can be eliminated or at least diminished, then vaporization and gasification to produce decomposed combustion fragments can occur much more rapidly, thereby increasing the transfer rate of the component to the combustion zone.

In accordance with the present invention a method is provided whereby the liquid component is modified by an additive which additive will react with the liquid component in an exothermic manner, thereby heating the liquid component to a high temperature whereby the liquid component is vaporized and partially decomposed. Thus the rate of heat transfer is greatly increased since there is no longer a cooling effect within the combustion zone by the addition of the liquid component.

In carrying out the present invention the material which is added to the liquid will be one which will react with the liquid partially burning it and heating it to a high temperature. Thus, if the liquid component of the hybrid engine is an oxidizer a small amount of a fuel element would be added to the oxidizer. For instance, if the liquid oxidizer were nitric acid or nitrogen tetraoxide, fuel elements such as ammonium nitrate, hydrazine nitrate, and nitromethane would be suitable additives. These mixtures have characteristic ignition temperatures below the boiling points where extremely rapid gasification occurs at a rate which is not dependent upon any further heat absorption from the surroundings. Such oxidizers would be suitable for use with fuels such as polyurethane, carboxylated butadiene acrylonitrile, polybutadiene acrylic acid and the like, with or without the addition of finely divided metals.

If a system is employed wherein a liquid fuel and a solid oxidizer such as ammonium perchlorate are used, a typical example would be the use of liquid hydrazine as the fuel with oxidizing additives such as hydrazine nitrate, ammonium nitrate and hydrazine nitroform.

Normally the additive must be one which is non-hypergolic with the component to which it is added. Under these conditions, the liquid component can be stored for long periods of time as in any normal hybrid. However, it is possible to achieve the purposes of the present invention even if the additive is hypergolic by mixing the two liquid components just as they are introduced into the combustion zone.

The amount of additive will always be less than the stoichiometric amount to react with the liquid so that there will be a substantial surplus of the liquid of the component available for reaction with the solid element. In other words, the amount of the additive must be such that in the case of the liquid oxidizer the net composition of the gases are still oxidizing and in the case of the liquid fuel the net composition of the fuel gases are reducing.

Generally speaking, the minimum quantity which is added should be at least enough to decompose and/or vaporize the liquid component and will normally be at least about 5% of the stoichiometric value. Normally, not more than 30% of the stoichiometric amount will be employed so that at least 70% of the liquid component will be available for reaction with the solid component of the rocket motor.

We claim:
1. In the process of creating thrust in a hybrid rocket engine comprising:
 (a) providing a solid phase and a liquid phase, said solid phase being incapable of self-combustion, and said liquid phase consisting essentially of
   (1) a liquid component in admixture with
   (2) a predetermined quantity of additive which is non-hypergolic to said liquid component at a first predetermined temperature but hypergolic to said liquid component at a higher, second predetermined temperature, said additive being in sufficient quantity so as to react at said second predetermined temperature with a relatively small portion of said liquid component so as to produce sufficient heat and energy to substantially fragmentize and volatilize the remaining liquid component;
 (b) storing said liquid phase at said first predetermined temperature;
 (c) placing said solid phase inside a combustion chamber;
 (d) injecting a predetermined amount of said liquid phase into the combustion chamber, said combustion chamber having a temperature zone at a predetermined distance from the surface of said solid, said zone having a temperature at least equal to said second predetermined temperature, said predetermined amount of said liquid phase passing through said zone thereby heating the liquid phase to said second predetermined temperature causing said additive and a relatively small portion of said liquid component of said predetermined amount of said liquid phase to react vigorously thereby causing the remaining liquid component of said predetermined amount of said liquid phase to substantially fragmentize and volatilize prior to contact with the solid phase of the hybrid engine;

(e) reacting the substantially fragmentized and volatilized liquid component with said solid phase to produce hot combustion gases; and
(f) ejecting the hot combustion gases from said combustion chamber thereby imparting thrust to the engine.

2. A process as in claim 1 wherein said liquid component is a liquid oxidizer and said additive is a fuel.

3. A process as in claim 1 wherein said liquid component is a liquid fuel and said additive is an oxidizer.

References Cited by the Examiner

UNITED STATES PATENTS

| | | |
|---|---|---|
| 3,017,748 | 1/1962 | Burnside. |
| 3,054,252 | 9/1962 | Beckett et al. _____ 149—36 X |
| 3,083,526 | 4/1963 | Hudson _____ 149—19 X |
| 3,095,693 | 7/1963 | Wamser _____ 149—74 X |
| 3,115,005 | 12/1963 | Clark _____ 60—35.4 |

CARL D. QUARFORTH, *Primary Examiner.*